July 31, 1956  F. F. HURLBURT ET AL  2,757,026
JOURNAL BOX SEAL
Filed Aug. 20, 1953

Fred F. Hurlburt
Charles H. Gillispie
INVENTORS

United States Patent Office 2,757,026
Patented July 31, 1956

2,757,026
JOURNAL BOX SEAL

Fred F. Hurlburt and Charles H. Gillispie, Cedar City, Utah, assignors of twenty per cent to Harold F. Hurlburt, Couperville, Wash., twenty per cent to Edward M. Hurlburt, Rock River, Wyo., and twenty per cent to Grace Hurlburt Lezer, Ogden, Utah Application August 20, 1953, Serial No. 375,317

1 Claim. (Cl. 286—6)

This invention relates generally to journal box and seal mechanism for railway vehicles and pertains more particularly to an improved form of construction for effecting longer grease seal life.

A primary object of this invention is to provide bumper mechanism for limiting of the whipping action of an axle journal within its journal box when the railway brakes are applied to obviate crushing of an associated grease seal and to provide a novel grease seal supporting assembly resiliently supporting the grease seal within the journal box to prevent damage thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
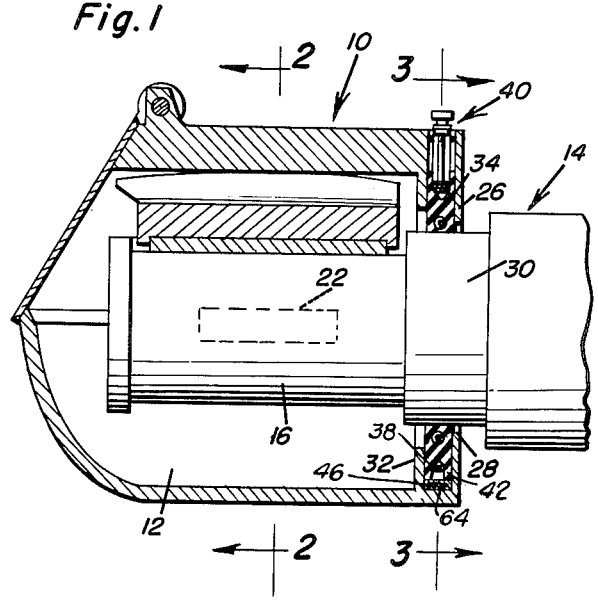
Figure 1 is a longitudinal section taken through a journal box assembly constructed in accordance with this invention and provided with the novel grease seal mechanism.

Referring now more particularly to the drawings, reference numeral 10 indicates generally a journal box housing which includes the bearing chamber 12 and reference character 14 indicates generally a railway vehicle axle having a reduced journal end 16 disposed within the journal box. The usual bearing block 18 is disposed within the journal box and has suitable bearing material 20 attached thereto to partially surround the journal 16 and to provide a support therefor, as is well understood. A pair of elongated limiting blocks 22 are welded or otherwise suitably secured to the journal box and the arcuated inner edges 24 of these blocks are spaced closely adjacent the opposite sides of the journal 16 such as to provide an abutment surface therefor to prevent undue whipping action of the axle 14 when the vehicle brakes are applied.

This, it will be appreciated, is for the purpose of limiting the movement of the railway vehicle axle with respect to its journal boxes, a movement which normally occurs during heavy braking action and which would obviously have a detrimental effect on any grease seals used in conjunction with the axle. In other words, the limiting blocks will tend to reduce a "whipping" action on the free end of the axle due to a brake application, said reduction of whipping action tending to prevent crushing or distorting the associated axle grease seal journaled about said free end portion.

The journal box includes the end wall 26 having the opening 28 to receive the shoulder 30 of the axle 14 and the inwardly projecting flange 32 of the journal box is disposed in spaced parallel relation to the end wall 26 in the manner shown to provide a space between the wall 26 and flange 32 into which the grease seal 34 is inserted. The grease seal is constructed in the manner described in our co-pending application, Serial Number 349,372, filed April 17, 1953, and entitled Journal Box Grease Seal. The seal includes a peripheral groove 36 into which the contractible band 38 is received and adjusting mechanism 40 is provided for this band in the manner described in the co-pending application. To prevent damage to the grease seal and especially the spaced outer edges 42 thereof formed by the circumferential groove 36, a seal supporting frame indicated generally by the reference character 44 is provided.

Figure 4:
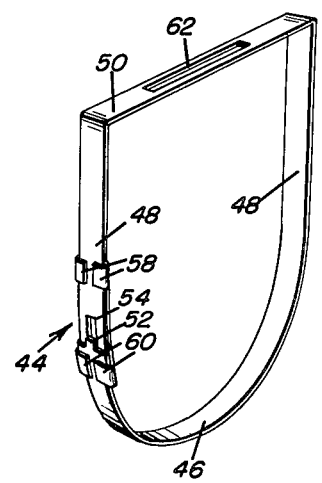
Figure 4 is a perspective view of the grease seal supporting frame.
Figure 3:
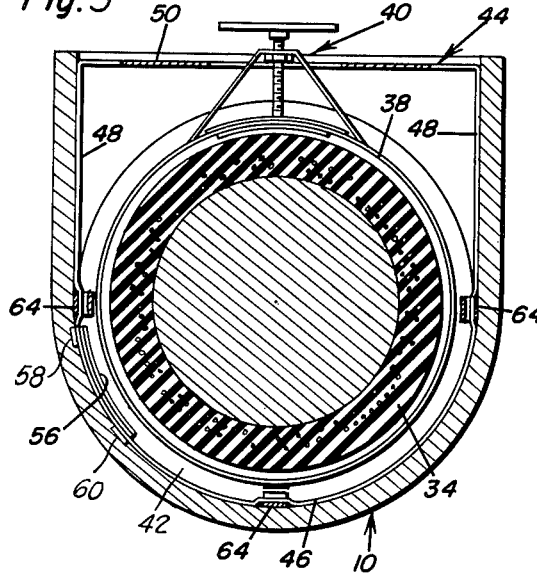
Figure 3 is a transverse vertical section taken substantially along the plane of section line 3—3 in Figure 1.
Figure 2:
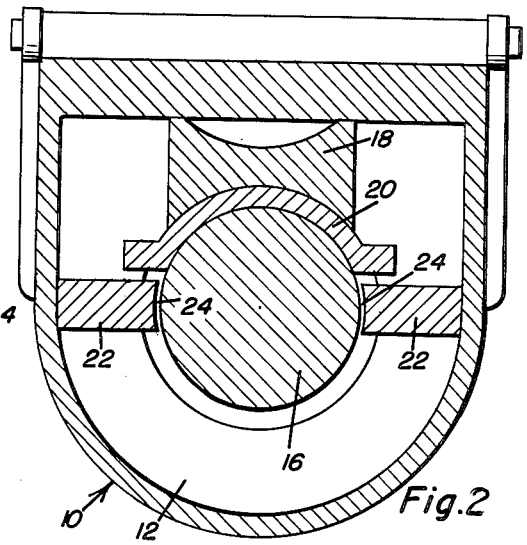
Figure 2 is a transverse vertical section taken substantially along the plane of section line 2—2 in Figure 1.
Figure 5:
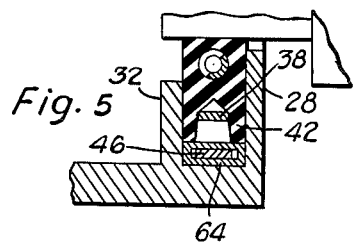
Figure 5 is an enlarged fragmentary view of a detail of Figure 1.

The frame is formed from a single piece of spring steel configurated such that its arcuate bottom portion 46 is snugly received within the groove or space formed between the members 26 and 32 and the upright portions 48 thereof engage the opposed walls of this space in the manner shown most clearly in Figure 3 with the upper horizontal portion 50 of the frame disposed within the slotted opening at the top of the journal box, the disposition of said frame retarding rotation thereof about the axle. Opposite ends of the support frame 44 are provided with the tongue and slot connections 52 and 54 respectively with the tongue 52 interlockingly engaged in the slot in the manner shown most clearly in Figure 4 and, to insure proper engagement between these ends, a short strip of material 56 is provided which includes the laterally projecting ears 58 and 60 at its opposite ends bent over and engaged with the frame 44 in the manner shown.

The upper portion 50 of the frame is provided with an elongated slot 62 through which the previously described mechanism 40 extends and during assembly, the grease seal is secured to the frame 44 by means of straps 64 in the form of loops interlaced with the grease seal 34 and extending around the frame 44 in the manner shown, said loops extending transversely through the circumferential groove 36 of the seal and through the spaced outer edges 42 thereof.

Consequently the body of the grease seal is firmly supported in the journal box and is oriented properly with respect to the axle at all times by the support assembly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A grease seal assembly for journal boxes containing a lubricant comprising a resilient support frame having a periphery conforming to the cross-sectional configuration of the journal box, said frame including a lower arcuate portion, a centrally apertured grease seal of pliable resilient material circumposed on an intermediate portion of the journal shaft in the journal box, said seal including a circumferential groove portion defining a pair of spaced peripheral sealing edge portions, said grease seal extending transversely within the support frame with the peripheral sealing edge portions in concentric sealing engagement with the lower arcuate portion of said frame, and a plurality of loop elements disposed along the lower arcuate portion of the support frame, said loop elements extending transversely through the peripheral sealing edge portions and around the concentrically related arcuate portion of the support frame whereby said resilient frame tends to absorb shock and crushing action on the grease seal during braking action on the journal shaft.

References Cited in the file of this patent

UNITED STATES PATENTS

| | | |
|---|---|---|
| 270,262 | Sweeney | Jan. 9, 1883 |
| 404,701 | Goullioud | June 4, 1889 |
| 657,979 | Crone | Sept. 18, 1900 |
| 688,754 | Tazewell | Dec. 10, 1901 |
| 772,788 | Cribb | Oct. 18, 1904 |
| 1,941,486 | Pilcher | July 24, 1934 |